June 17, 1930.  M. LOUGHEAD  1,764,178
MULTICYLINDER HYDRAULIC BRAKE
Filed March 17, 1927   2 Sheets-Sheet 2
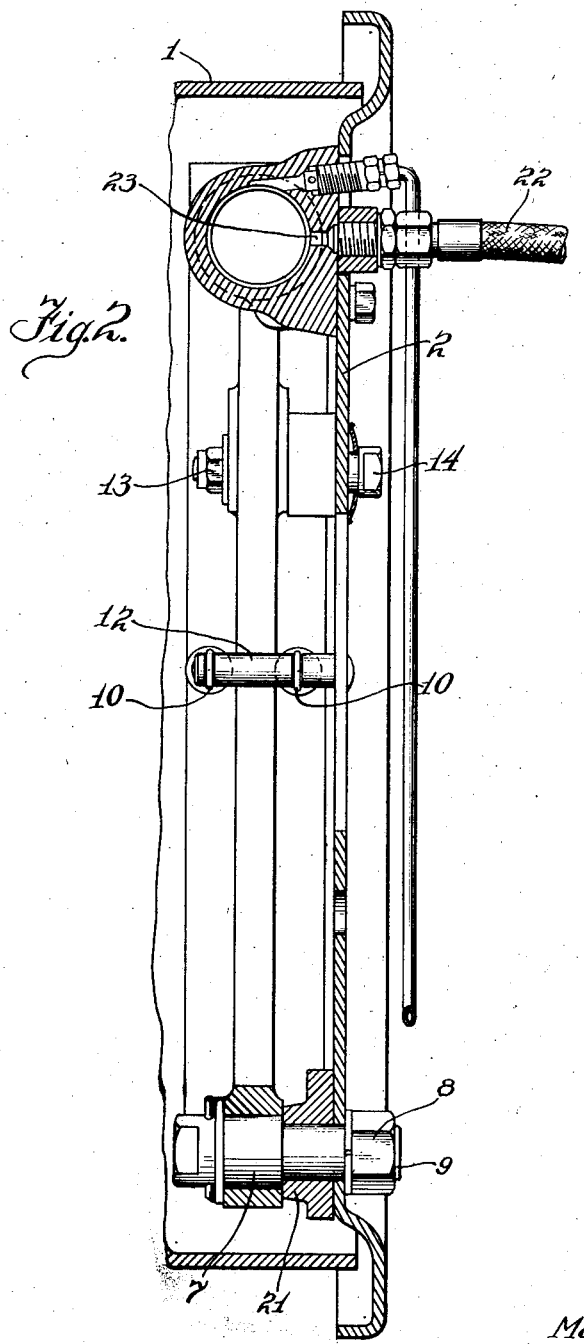
Inventor:
Malcolm Loughead.
By Williams, Bradbury,
McCaleb & Hinkle
Attorneys.

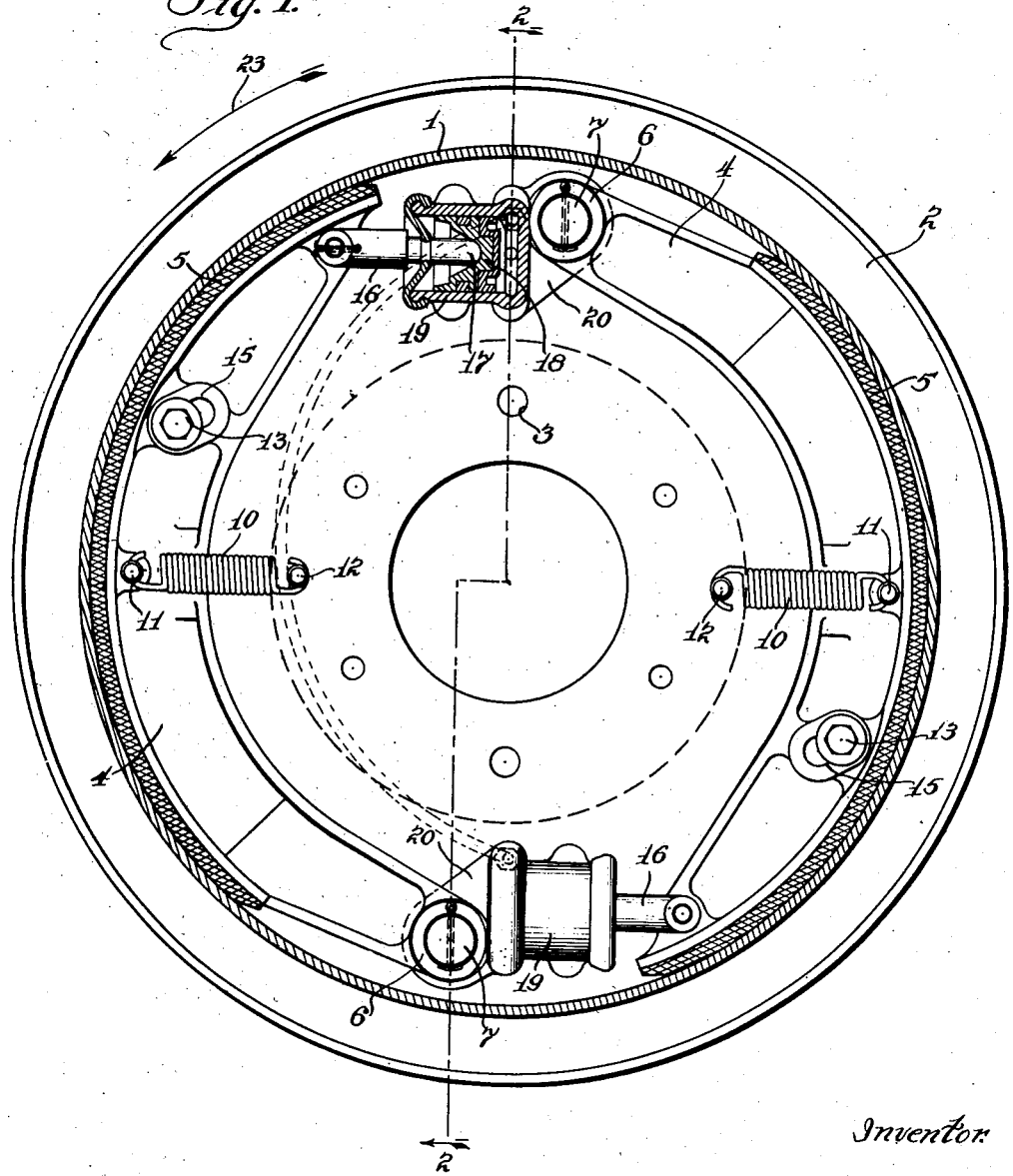

Patented June 17, 1930

1,764,178

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

MULTICYLINDER HYDRAULIC BRAKE

Application filed March 17, 1927. Serial No. 175,958.

My invention relates to improvements in multicylinder hydraulic brakes, and more particularly to that type of brake in which each shoe is provided with hydraulic actuating mechanism for the actuation thereof.

An object of my invention is to provide a hydraulic brake by means of which I utilize the maximum braking properties of each shoe when the vehicle of which the brakes are a part is moving in one direction, namely forward.

A further object of my invention is to provide a hydraulic brake in which the engagement of each shoe with the brake drum, as by actuation of the hydraulic operating mechanism is augmented by the force applied thereto by rotation of the brake drum toward the pivotal support of the shoe.

Other objects and advantages of my invention will appear from the following description of a particular embodiment thereof, as illustrated in the accompanying drawings, wherein Fig. 1 is an elevation partially in section illustrating an embodiment of the invention, and Fig. 2 is a sectional view along the line 2—2 of Fig. 1.

In carrying out the invention I make use of the ordinary type of brake drum 1, which is carried by the wheel of the vehicle upon which the brake mechanism is employed. A dust pan 2 serves to close the inner end of the drum 1 and provide confined space for the brake mechanism. The dust pan 2 is stationary and secured as by rivets 3 to a stationary part of the axle assembly of the vehicle.

I provide a pair of substantially crescent shaped brake shoes 4, each of which carry brake bands 5 on the outer surfaces thereof for engagement with the drum 1.

The shoes 4 are each pivotally mounted at 6 upon mounting pins 7 which are secured by the provision of nuts 8 disposed upon threaded portions 9 of the pins to the dust pan 2. The pins 7 in the present embodiment are disposed 180° apart.

Each shoe 4 is provided with two tension springs 10 connected to the shoe at one end and to laterally extending pins 12 on the dust pan 2 at the opposite end.

Means for limiting the pivoting movement of the shoes 4 is provided by bolts 13 secured at 14 to the pan 2 and having their laterally projecting portions extending through guide slots 15 provided in the shoes 4.

Each of the shoes 4 has secured at its free end a brake shoe operating rod or thrust link 16, the outer end of which engages at 17 with a piston 18 disposed within a cylinder 19.

The cylinders 19 each have at their inner ends lug portions 20 provided with integral bearing members 21, which bearing members are disposed upon the inner portions of the mounting pins 7 (see Fig. 2). The cylinders are thus free to move on their pivotal support, so that there is no strain to this part of the mechanism when pressure is applied, as by the application of fluid pressure throughout the flexible conduit 22 which communicates at 23 with the interior of the cylinder 19 to force the piston outwardly.

The foot pedal and associate mechanism for exerting fluid pressure within the cylinder is fully disclosed and described in my prior Patent No. 1,249,143, issued December 4, 1917. Such mechanism is now well known in the art.

In normal operation the vehicle upon which the brakes are mounted travels in a forward direction, and the brake drum 1 rotates in that direction indicated by the arrow 23.

Assuming now that fluid pressure is applied to the cylinders 19 against the piston 18, as described, the pistons 18 would move outwardly to exert longitudinal thrust upon the rods or thrust links 16. This causes the shoes 4 to move upon their pivotal mounting pins 7 against the tension of the springs 10 to bring the brake lining 5 into engagement with the drum 1.

I find from the actual force applied by the movement of the shoes 4 toward the brake drum 5, there is in addition increased frictional engagement between brake lining 5 and the drum caused by the tendency of the shoes to move toward the drum because of the rotation of the drum toward the pivotal mounting of the shoes.

It is a well established fact that the braking power of an internal brake shoe mounted at that end remote from the direction of rotation of the drum is many times that of a similar shoe pivotally mounted at that end adjacent to the direction of rotation. In the ordinary type of twin shoe internal brake one of the shoes is always pivotally mounted at that end adjacent to the direction of rotation of the drum. Thus, one shoe possesses many times the braking power of the complementary shoe.

I claim:

1. A vehicle wheel brake comprising a drum, a plurality of brake shoes for engagement with the drum, a fixed pivotal mounting pin for each of said shoes, said shoes being arranged with their pivotally mounted end adjacent to the free end of the adjacent shoe and motors having relatively stationary parts pivotally mounted upon the fixed pivotal mounting pins and having movable driven movable parts connected with the free end of the adjacent shoe.

2. In an internal brake mechanism, a brake drum, pivotally mounted shoes arranged for engagement with the brake drum, each shoe having its pivoted end remote from the normal direction of rotation of said drum, and fluid motors for moving the shoes into engagement with said drum, each motor pivotally supported upon the pivotal mounting of a shoe and operatively connected with the free end of the adjacent shoe.

In witness whereof, I hereunto subscribe my name this 11th day of March, 1927.

MALCOLM LOUGHEAD.